Figure 1:
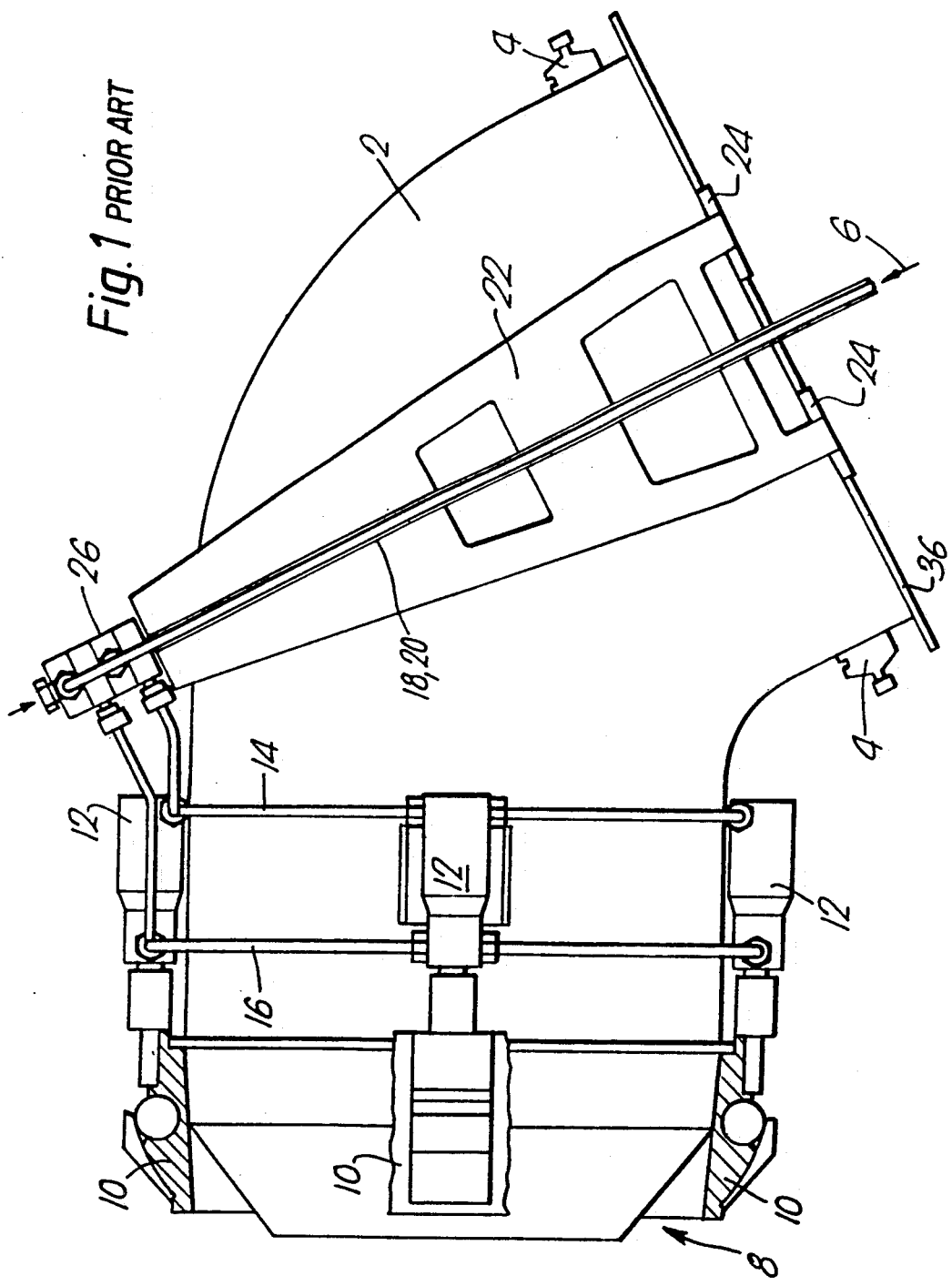

United States Patent [19]
Nightingale

[11] Patent Number: 5,011,195
[45] Date of Patent: Apr. 30, 1991

[54] CONSTANT VOLUME CONNECTOR

[75] Inventor: Douglas J. Nightingale, Jonesboro, Ga.

[73] Assignee: Rolls-Royce Inc., Atlanta, Ga.

[21] Appl. No.: 452,278

[22] Filed: Dec. 18, 1989

[51] Int. Cl.⁵ .............................................. F16L 27/00
[52] U.S. Cl. ................................... 285/302; 285/900
[58] Field of Search ......................... 285/302, 96, 900

[56] References Cited

U.S. PATENT DOCUMENTS

| | | | |
|---|---|---|---|
| 3,194,589 | 7/1965 | Kahlbav et al. | 285/302 |
| 4,071,268 | 1/1978 | Halling et al. | 285/900 |
| 4,146,253 | 3/1979 | Celommi | 285/302 |
| 4,311,327 | 1/1982 | Ortloff et al. | 285/900 |
| 4,615,542 | 10/1986 | Ideno et al. | 285/302 |

FOREIGN PATENT DOCUMENTS

| | | | |
|---|---|---|---|
| 2155981 | 5/1973 | Fed. Rep. of Germany | 285/900 |
| 2455645 | 6/1975 | Fed. Rep. of Germany | 285/900 |
| 576483 | 10/1977 | U.S.S.R. | 285/DIG. 1 |

Primary Examiner—Eric K. Nicholson
Attorney, Agent, or Firm—Oliff & Berridge

[57] ABSTRACT

A connector for conveying hydraulic pressure from a relatively fixed source to a relatively moveable hydraulically actuable arrangement is described. The connector comprises a telescoping assembly of hollow members opposite ends of which have means for joining the connector to hydraulic lines. A first of the telescoping members is formed with an integral annular chamber which is swept by annular piston means carried by a second of the telescoping members interengaged with the first. Dimensions are chosen so that a change in the internal volume of the telescoping members is compensated by the volume displaced by movement of the piston in the chamber whereby the total internal volume of the system remains constant.

15 Claims, 3 Drawing Sheets

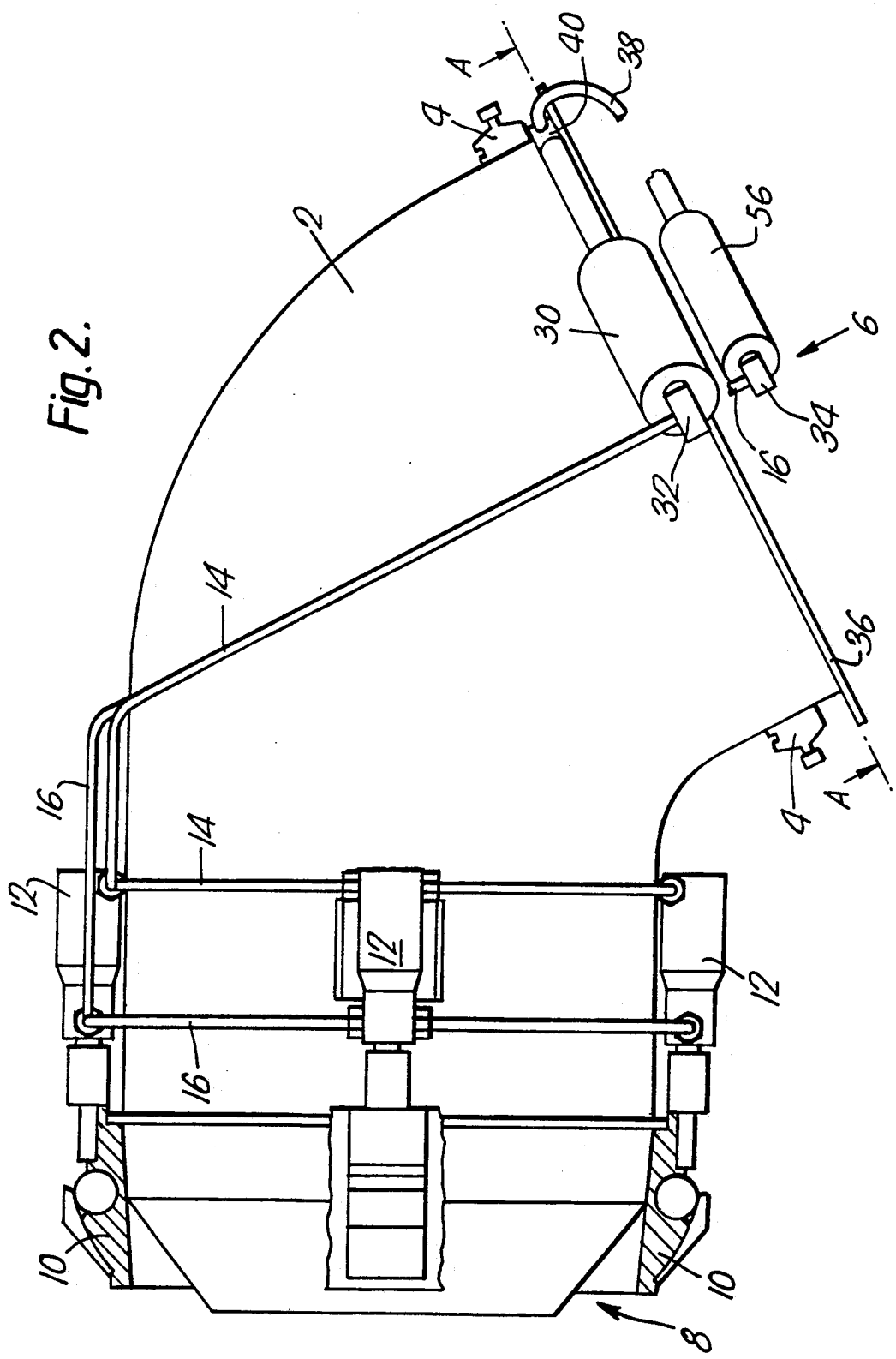

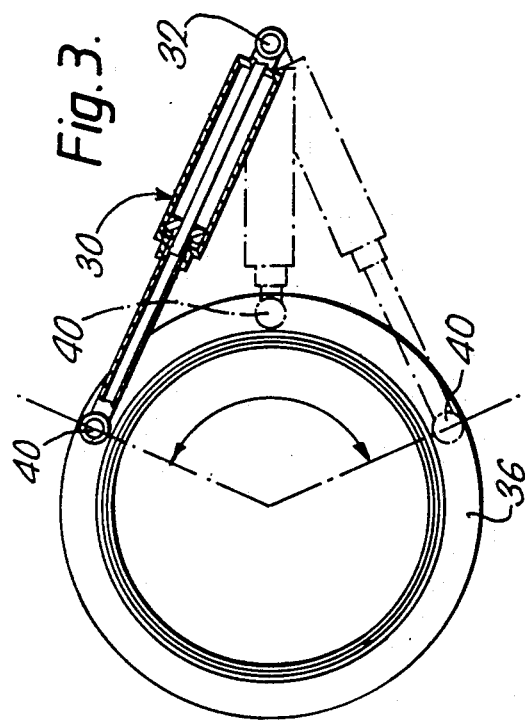
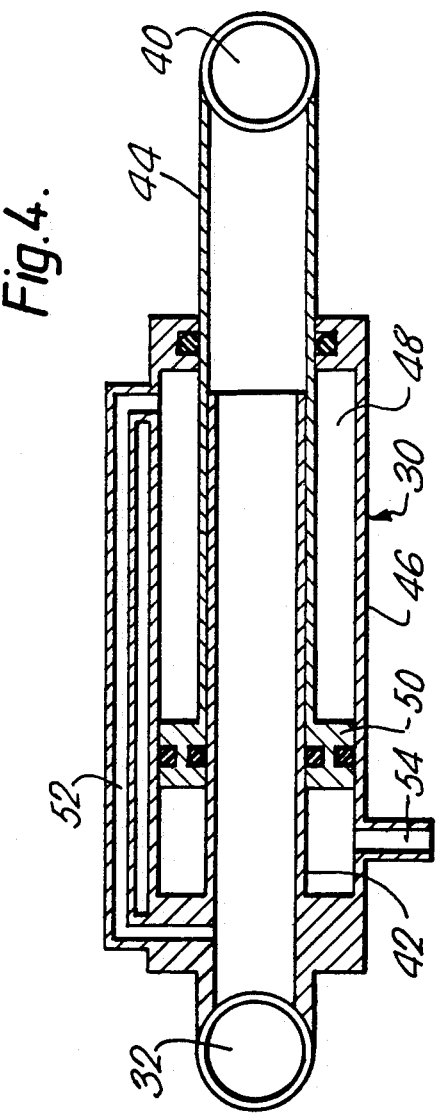

CONSTANT VOLUME CONNECTOR

The invention relates to a constant volume connector.

In particular the invention concerns means for conducting hydraulic operating fluid across a mechanical interface between two articulated members. For example, where a source of hydraulic fluid pressure is located on a first member and an arrangement to be controlled or energised by the fluid pressure is mounted on a second member pivotally mounted relative to the first member.

The invention may find particular utility in connection with a variable area outlet vectoring nozzle for a vertical take-off aircraft which has rotatable nozzles for in-flight manoeuvring, the fluid jet pipe nozzle being variable in area and energised by hydraulic pressure. In this sort of arrangement a problem arises because the variable area nozzle requires an actuation system capable of transmitting power between the aircraft engine, in the airframe, and the nozzle which is rotatable relative to the airframe on a vectoring bearing. Fluid feed and return lines must be routed across the vectoring bearing. The vectoring angle is typically in excess of 90° and at a high pressure in excess of 3,000 psi. These conditions effectively rule out flexible hoses. In any case flexible hoses tend to be short on reliability in situations involving high temperatures and high pressures.

A previous attempt to solve this problem is illustrated in FIG. 1 of the accompanying drawings. The drawing shows a vectorable elbow nozzle 2 which is mounted in a circumferential vectoring bearing 4 for rotational movement about a vectoring axis 6. Rotation of the nozzle 2 about this axis 6 is used to control the direction of the thrust vector between downward thrust for vertical take-off and rearward horizontal thrust for forward flight. A variable area nozzle 8 is fitted to the distal end of the elbow nozzle 2 whereby variation of the orifice area is an effective means of controlling the dynamic pressure in the engine jet pipe and turbine section (not shown).

The interlocking flaps 10 which make up the variable area section of the nozzle 8 are operated by a plurality of hydraulic actuators 12 spaced apart circumferentially on the outer end of the vectorable elbow nozzle 2. Pressure feed and return hydraulic lines 14, 16 which interconnect the actuators 12 are connected with the airframe hydraulic circuits via further hydraulic lines 18, 20 supported by a fixed mounting arm 22. The arm 22 is fixed to the airframe at mounting points 24 located at one side of the nozzle vectoring bearing 4. The arm extends outwards from the airframe adjacent to the nozzle and follows the curve of the nozzle envelope spaced a short distance away from its surface. The length and curve of the arm is such that its distal end intersects the vectoring axis 6. The hydraulic lines 18, 20 are carried by and follow the curve of arm 22.

Swivel couplings 26 are mounted at the distal end of arm 22 co-axially with the nozzle vectoring axis 6 and these connect respectively the hydraulic lines 14, 16 with lines 18, 20. Because the rotational axis of the couplings 26 coincides with the vectoring axis 6 of nozzle 2 the hydraulic actuating circuit for the variable area nozzle 8 is free of unwanted mechanical strain without resorting to the use of flexible hoses.

Unfortunately the arrangement of FIG. 1 suffers several drawbacks. In particular substantial space is required on the outboard side of the nozzle casing to accommodate the mounting arm 22, hydraulic lines 18, 20 and swivel couplings 26. These externally mounted hydraulic components are vulnerable to damage because of their exposed location. Also, a fairing is almost certainly required to enclose the coupling assembly and this would produce a protuberance drag penalty.

The present invention has for one of its objects to overcome these drawbacks by providing an alternative arrangement for conveying hydraulic fluid pressure between the airframe and the variable area nozzle actuators mounted on the outboard end of the vectoring nozzle.

In its most general form the invention comprises for interconnecting two conduits a telescopic assembly arranged to possess an internal space of constant volume regardless of the overall length of the assembly.

In accordance with one aspect of the invention there is provided a constant volume connector for providing a constant volume fluid path joining two relatively moveable conduits which comprises a telescoping assembly of hollow members the opposite ends of which are connected with the conduits to provide a fluid path therebetween, a piston moveable with one of the telescoping members which is slidably engaged with a cylinder moveable with another of the telescoping members and transfer means interconnecting the trapped volume in the cylinder on one side of the piston with the fluid path through the telescoping members so that movement of the telescoping members displaces the piston and causes an interchange of fluid through the transfer means between the fluid path within the telescoping members and the trapped volume in the cylinder whereby to compensate for a change in volume of the telescoping members.

The invention and how it may be carried into practice will now be described, by way of example only, with reference to an embodiment illustrated in the accompanying drawings, in which:

FIG. 1 already mentioned above shows a variable area vectoring nozzle with a known hydraulic system arrangement, FIG. 2 is a view of the vectoring nozzle of FIG. 1 with a modified hydraulic system incorporating a telescopic connector, FIG. 3 is a view of section AA of FIG. 2 illustrating the operation of the telescopic connection, and FIG. 4 shows a diagrammatic cutaway section of the telescopic connector of FIGS. 2 and 3.

The telescopic hydraulic connector assembly of the drawings is designed to ensure that its internal volume remains constant irrespective of its length, within the limits of its range of movement. FIG. 2 shows the range of movement required of a telescopic assembly 30 when installed on a vectoring nozzle 2, the internal volume of the assembly 30 remains constant irrespective of the nozzle vectoring angle. The internal fluid transfer passages of the assembly are large enough to avoid damping effects which would otherwise increase the power required to swivel the vectoring nozzle.

FIGS. 2 and 3 show a basic nozzle arrangement identical with that shown in FIG. 1 and described above, like parts carrying like references. In particular, the vectoring bearing 4 which allows the nozzle 2 to swivel about vectoring axis 6 is unchanged. Also unchanged is the variable nozzle 8 and its hydraulic actuators 12 for operating the moveable flaps 10. The invention replaces the prior art arrangement for physically connecting the hydraulic lines 18, 20 from the airframe supply to the actuators 12.

The fixed arm 22 carrying the hydraulic lines 18, 20 and the swivel couplings 26 of FIG. 1 are replaced by the telescopic arrangement generally indicated at 30. The hydraulic feed and return lines 14, 16 connected with the actuators 12 and mounted on the outboard end of the swivelling nozzle 2 are laid close to the outer surface of the nozzle elbow. These hydraulic lines 14, 16 are still fixed in relation to the nozzle 2 but run close to its surface and now extend as far as terminations 32, 34 respectively adjacent to a peripheral flange 36 at the nozzle swivel joint. The supporting arm and the swivel joints carried at its distal end are dispensed with in this arrangement. The pipe runs laid close to the surface of the nozzle protrude less than the previous arrangement and occupy less space, at least outboard of the airframe.

The hydraulic lines 14, 16 are thus moveable with the swivelling nozzle relative to the airframe. Each of the lines is coupled with an hydraulic circuit, such as 38, within the airframe by means of a telescopic connector 30. As will be immediately apparent from inspection of FIG. 3 the range of travel of the telescopic assembly is sufficient to accommodate an angular transverse of the swivelling of up to about 180°. Throughout the range of movement of the connector 30 its volume remains substantially constant. In fact virtually no variation of internal volume is permissible as this would affect the pressure in the hydraulic lines and could lead to unintentional movement of the actuators 12 and possible deployment of the flaps 10.

FIG. 4 illustrating a cutaway section on the longitudinal axis of the connection 30 shows the terminations 32, 40 which communicate with the line 14 and 38 respectively at opposite ends of the assembly. Between the terminations 32, 40 there is an assembly of hollow telescoping members. In this embodiment the assembly comprises two principal concentric tubular members 42, 44 which slide one with the other. The members 42, 44 are in open communication with each other and with the terminations 32, 40 respectively.

The tubular member 42 is formed as the innermost part of a concentric integral body, the outer wall 46 of which defines in co-operation with the radially outermost wall of the tubular member 42 an annular volume 48. The second tubular member 44 is slidably engaged with the said outermost wall of member 42. At its end remote from the termination 40 the member 42 is formed with an annular flange 50 which engages with the walls of the annular volume 48 to act in the manner of a reciprocable piston working within a cylinder. Sealing rings may be provided in grooves in the radially inner and outer faces of the piston-like flange 50.

The annular space defining the volume 48 is closed at both ends of the member comprising concentric wall 42, 46. The space on one side of the piston 50 is connected through a transfer passage 52 with the interior of the inner tubular member 42 and therefore with the hydraulic circuit. The space on the opposite side of the piston is vented to atmosphere through a vent port 54. There may be a plurality of transfer passages, such as 52 which may be formed integrally in the wall of the member 42 or by externally secured tubes or the like. Also, there may be a plurality of vent ports, such as 54.

In operation, as the telescoping members 42, 44 slide one within the other the total volume enclosed by them is proportional to their overall length. However, by the illustrated arrangement the volume 48 on one side of the piston 50 is also determined by the overall length of the members but in inverse proportion. By the choice of appropriate dimensions for the radii of the concentric walls 42, 44 and 46 it can be arranged that for any given movement of the telescopic arrangement the volume displaced by the piston 50 is equal to but in opposite sense to the increase or decrease in volume of the volume enclosed by the tubes 42, 44 alone.

A telescoping arrangement as just described is provided in each of the supply and return hydraulic lines 14, 16; in FIG. 2 one end of a second such connector is indicated at 56 attached to the swivel coupling 34. In the illustrated embodiment the telescoping connectors are mounted as two separate units side by side. These could be combined together in a single assembly having distinct internal volumes and four external couplings, one at either end of each of the volumes. A co-axial arrangement of two such telescoping assemblies is possible.

The seals required may be the same as those already in use in hydraulic linear actuators. The swivel couplings, e.g. at 32, 34 and 40, may be of a known ball bearing type, as at 26 in FIG. 1 and manufactured for aerospace applications. Whilst the telescoping connector of the invention has been described with reference to its use in an aircraft vectoring nozzle, it is to be understood that this is not its sole use. It may find utility in many other applications, one such application would be to connect hydraulic brake actuating fluid to a suspended wheel assembly in a vehicle. Other applications may be envisaged.

I claim:

1. A constant volume connector for providing a constant volume fluid path joining two conduits having compound relative movement therebetween in any direction, said connector comprising:

a telescoping assembly comprising a plurality of hollow members which define a first internal fluid path of variable length;

swivel means at either end of the telescoping assembly for connecting said first internal fluid path with the moveable conduits;

cylinder means moveable with one of said plurality of hollow members of the telescoping assembly;

piston means moveable with another of said plurality of hollow members, said piston means being slidably engaged with said cylinder means to define a second internal fluid path having a volume which varies according to the length of the telescoping assembly and in inverse proportion to the volume of said first internal fluid path; and transfer means connecting said second internal fluid path with said first internal fluid path;

whereby for a change in length of the telescoping assembly, the change in volume of said second internal fluid path by displacement of the piston means is equal to the opposite change in volume of the first internal fluid path due to the compound relative movement of the conduits in any direction.

2. The constant volume connector according to claim 1, wherein said hollow members comprise two members, and wherein the cylinder means defines an annular space surrounding a first of the two members and the piston means comprises an annular member carried by a second of the two members.

3. The constant volume connector according to claim 2 wherein said first internal fluid path and said cylinder means are concentric.

4. The constant volume connector according to claim 1 wherein said transfer means comprises at least one duct in open communication with fluid in said second internal fluid path on one side of the piston means, and with said first internal fluid path.

5. The constant volume connector according to claim 4 wherein the at least one duct comprises an external tube.

6. The constant volume connector according to claim 4 wherein the at least one duct is formed in the cylinder wall.

7. The constant volume connector according to claim 1 wherein means defining the cylinder means moveable with one of the telescoping member is formed integrally with the said member.

8. The constant volume connector according to claim 1 wherein said piston means is formed integrally with said another of said plurality of hollow members.

9. The constant volume connector according to claim 1, wherein the swivel means is a swivel coupling.

10. The constant volume connector according to claim 1, wherein said two conduits comprise one stationary conduit and one movable conduit, and wherein said compound relative movement in any direction comprises movement where said telescoping assembly and said moveable conduit are pivotal about said stationary conduit.

11. The constant volume connector according to claim 1, wherein said two conduits comprise a stationary conduit and a moveable conduit, and wherein said compound relative movement in any direction comprises movement where there is a change in the angle formed between said telescoping assembly and said stationary conduit.

12. The constant volume connector according to claim 1, wherein said compound relative movement in any direction comprises movement where a distance between said two conduits changes.

13. The constant volume connector according to claim 1, wherein said compound relative movement in any direction comprises relative pivotal movement and relative translational movement.

14. The constant volume connector according to claim 1, wherein said two conduits comprise one moveable conduit and one stationary conduit.

15. The constant volume connector according to claim 1, wherein said compound relative movement in any direction comprises both angular displacement of one conduit relative to the other and a change of the distance between said two conduits.

* * * * *